United States Patent [19]
Porter, Jr. et al.

[11] Patent Number: 5,263,160
[45] Date of Patent: Nov. 16, 1993

[54] AUGMENTED DOUBLY-LINKED LIST SEARCH AND MANAGEMENT METHOD FOR A SYSTEM HAVING DATA STORED IN A LIST OF DATA ELEMENTS IN MEMORY

[75] Inventors: James A. Porter, Jr., Peyton; Donald E. Matthews, Woodland Park; Dennis E. Haugh, Colorado Springs, all of Colo.

[73] Assignee: Digital Equipment Corporation, Maynard, Mass.

[21] Appl. No.: 648,079

[22] Filed: Jan. 31, 1991

[51] Int. Cl.$^5$ .................. G06F 7/22; G06F 12/00
[52] U.S. Cl. ..................... 395/600; 395/650; 395/400; 395/425; 364/251.5; 364/254.6; 364/DIG. 1; 340/146.2
[58] Field of Search ............ 395/600, 400, 425; 364/DIG. 1, DIG. 2; 370/60; 340/146.2

[56] References Cited

U.S. PATENT DOCUMENTS

| | | | |
|---|---|---|---|
| 4,679,139 | 7/1987 | Durbin | 364/200 |
| 4,887,260 | 12/1989 | Carden et al. | 370/60 |
| 5,043,885 | 8/1991 | Robinson | 364/200 |
| 5,175,857 | 12/1992 | Inoue | 395/80 |

*Primary Examiner*—Thomas C. Lee
*Assistant Examiner*—Michael A. Oblon
*Attorney, Agent, or Firm*—Kenneth F. Kozik; Denis G. Maloney; Barry N. Young

[57] ABSTRACT

A method of searching and maintaining data elements in memory which are stored in a doubly-linked list. A logically related address component array is used to access data elements in the list. The list is divided into list segments which are dynamically maintained to decrease overall access time.

5 Claims, 12 Drawing Sheets

AUGMENTED DOUBLY-LINKED LIST SEARCH AND MANAGEMENT METHOD FOR A SYSTEM HAVING DATA STORED IN A LIST OF DATA ELEMENTS IN MEMORY

FIELD OF INVENTION

This present invention is related to storing data on a digital computer, and in particular, to an improved method of managing and searching medium amounts of data.

BACKGROUND OF THE INVENTION

A search method is a method that accepts an argument a and tries to find a record whose key is a. The method may return the entire record or, more commonly, it may return a pointer to that record. It is possible that the search for a particular argument in a table is unsuccessful; that is, there is no record in the table with that argument as its key. In such a case, the method may return a special "nil record" or a nil pointer. Very often, if a search is unsuccessful, it may be desirable to add a new record with an argument as its key. A method that does this is called a search and insertion method. A successful search is often called a retrieval.

Sequential Search Method

The simplest form of a search is the sequential search. This search is applicable to a table that is organized either as an array or as a linked list. A sequential search method would examine each key in turn, and upon finding one that matches the search argument, its index (which as a pointer to its record) is returned. If no match is found, 0 is returned.

Efficiency of Sequential Searching

If we assume no insertions or deletions, so that we are searching through a table of constant size n, then the number of comparisons depends on where the record in the argument key appears in the table. If the record is the first one in the table, only one comparison is performed; if the record is the last one in the table, n comparisons are necessary. If it is equally likely for an argument to appear at any given table position, a successful search will take (on the average) $(n+1)/2$ comparisons, and an unsuccessful search will take n comparisons. In any case, the number of comparisons is $O(n)$, that is, a function of n, the size of the table or list.

Searching an Ordered Table

If the table is stored in ascending or descending order of the record keys, there are several techniques that can be used to improve the efficiency of searching. This is especially true if the table is of fixed size. One advantage in searching a sorted file over searching an unsorted file is in the case where the argument key is absent from the file. In the case of an unsorted file, n comparisons are needed to detect this fact. In the case of a sorted file, assuming that the argument keys are uniformly distributed over the range of keys in the file, only $n/2$ comparisons (on the average) are needed. This is because we know that a given key is missing from a file which is sorted in ascending order of keys as soon as we encounter a key in the file which is greater than the argument.

The Binary Search

The most efficient method of searching a sequential list without the use of auxiliary indices or lists is a binary search. Consider an array of elements in which objects have been placed in some order. If the array contains only one element, the problem is trivial. Otherwise, compare the item being searched for with the item at the middle of the array (or list). If they are equal, the search has been completed successfully. If the middle element is greater than the item being searched for, the search process is repeated in the first half of the array (since if the item appears anywhere, it must appear in the first half); otherwise, the process is repeated in the second half. Note that each time a comparison is made, the number of elements yet to be searched is cut in half. For large arrays, this method is superior to the sequential search, in which each comparison reduces the number of elements yet to be searched by only one. Each comparison in a binary search reduces the number of possible candidates by a factor of 2. Thus the maximum number of key comparisons that will be made is approximately $\log(2)n$.

Unfortunately, the binary search method can only be used if the list is stored as an array. This is because it makes use of the fact that the indices of array elements are consecutive integers. For this reason, in the past, the binary search has been found to be useless in situations where there are many insertions or deletions, so that an array structure is inappropriate.

Additional Methods

Additional methods for searching and managing lists of elements include 3-2 tree searching methods, B-tree of order m searching methods, Balanced Binary Tree searching methods, and various other methods that are typically found in college level data structures text books, such as A. Tenenbaum & M. Augenstein, Data Structures Using Pascal (Prentice-Hall 1981).

A 3-2 tree is one which each node has two or three sons and contains either one or two keys. If a node has two sons, it contains one key. All keys in its left subtree are less than that key and all keys in its right subtree are greater than that key. If a node has three sons, it contains two keys. All keys in its left subtree are less than its left key, which is less than all keys in its middle subtree. All keys in its middle subtree are less than its right key, which is less than all keys in its right subtree.

A B-tree of order m is a generalization of the 3-2 trees. Such a tree is defined as a general tree that satisfies the following properties:

1. Each node contains at most $m-1$ keys.
2. Each node except for the root contains at least (m div 2)$-1$ keys.
3. The root has at least two sons, unless it is a leaf.
4. All leafs are on the same level.
5. A nonleaf node with n keys has $n+1$ sons.

A Balanced Binary Tree is a binary tree in which the heights of the two subtrees of every node never differ by more than one. The balance of a node in a binary tree is defined as the height of its left subtree minus the height of its right subtree. Node deletion is not covered within the Balanced Binary Tree method, and must be done using other techniques. A detailed treatment of Balanced Binary Trees may be found in any of several college-level textbooks on data structures, as mentioned previously.

There is a non-deterministic nature of Balanced Binary Tree overhead that arises from two factors. First of all, the tree is actually not perfectly balanced, which makes search time greater than the theoretical $O(\log(2)n)$. Secondly, the effort required for re-balancing is significant and difficult to quantify. Nodes are inserted as leaves at the bottom of the tree, and operations known as rotations may then be applied in order to restore some semblance of balance. These rotations are difficult to understand and appear to be quite compute-intensive. While the number is bounded for node insertion, node deletion may result in many rotations that propagate throughout the tree. It has been suggested that the processing necessary for re-balancing due to node deletions be collected into a background task that is invoked when necessary. This introduces an asynchronous characteristic into the re-balancing effort that could conceivably be quite troublesome.

Since the maintenance activities described above can effectively block new searches of the tree, some of the benefit of the fast lookup is lost. For this reason, the search time of a Balanced Binary Tree can more accurately be described as $O(\log(2)n + (delta))$, where (delta) is the additional overhead that results from the two factors described above, i.e., tree imbalance and re-balance processing.

The Balanced Binary Tree techniques, while academically elegant, may be viewed as being more complex and may incur much more compute overhead for tree node deletions. As an example, cached controllers are expected to be dynamically deleting as well as adding cache index entries to their cache data structures. This extra overhead needed for deletions (a non-deterministic amount of processing requirements) does not fair well in a storage controller with real-time constraints.

SUMMARY OF THE INVENTION

It is the object of the present invention to provide an efficient methodology to search and manage medium-sized lists of data elements. An array is created in memory and initialized to contain no components. A group of ordered data elements is set up using a doubly-linked list. Using a mathematical relationship involving the integer value of the square root of the total number of data elements, the doubly-linked list is grouped into list segments. The address component of the initial member of each list segment is placed in the array. The relationship between the number of data elements and the corresponding number of list segments with their corresponding address components is dynamic in that the groupings of list segments may change in response to the addition or deletion of data elements. Search time is minimized in that in looking for any one data element, the number of steps required in sequentially searching the data element list is reduced to beginning at the first component of a list segment. Initiating a search involves a binary search on the array of address components, and then entry into the doubly-linked list at the start of the corresponding list segment.

Additional objects and advantages of the invention will be set forth in part in the description which follows and in part will be obvious from the description. The objects and advantages of the invention may be realized and obtained by means of the instrumentalities and combinations particularly pointed out in the appended claims.

The invention has characteristics of arrays and doubly-linked lists. Since it is a doubly-linked list augmented with an array, the technique of this invention has been termed Augmented Doubly-Linked list, or ADL list.

BRIEF DESCRIPTION OF THE DRAWINGS

The improvements of the present invention over the prior art and the advantages resulting therefrom will become more apparent upon reading the following description of the preferred embodiment in which.

DESCRIPTION OF THE PREFERRED EMBODIMENTS

Figure 1:
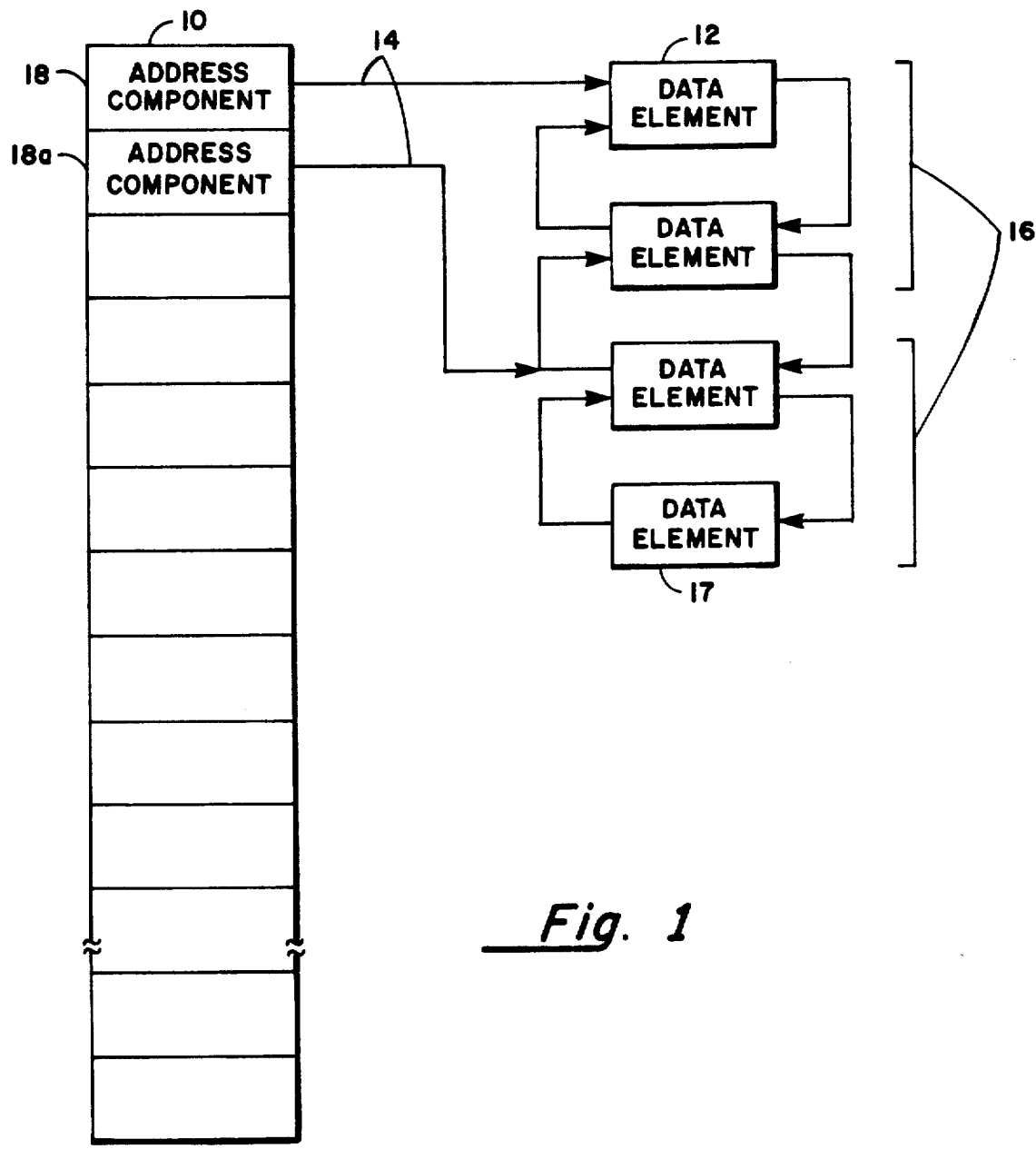
FIG. 1 is a block diagram showing an ADL list, in accordance with the invention, with four data elements.

Referring to the drawings, and more particularly FIG. 1, the augmented doubly-linked list (ADL list) search and management method comprises an array of address components 10 providing a plurality of entry points 14 into a doubly-linked list of data elements 12. The doubly-linked list of data elements 12 is divided into a plurality of list segments 16. Any number, of data elements 17 can be associated with address components 18 and 18a, as will be described below beginning with FIG. 3. Furthermore, it is shown below that several dynamic events occur during the addition or deletion of a data element 17. As the number of data elements 17 change in the doubly-linked list 1, the number of list segments 16 may change. If there is a change in the number data elements within the list segments 16, then the address components 18 and 18a will change in response, thereby changing the entry points 14 that are required to access the first data element of each list segment 16.

In FIG. 1 an array is chosen because of the capability of conducting a binary search on the array elements, i.e. address components 18 and 18a, and therefore capitalizing on the performance of the binary search. A linked list is the simplest type of dynamic data structure. It provides a solution to the problem of maintaining a list to which components may be added or deleted at random. A list that has backward as well as forward pointers is called a doubly-linked list 12. It makes additions and deletions efficiently, but it is time consuming if the entire list needs to be traversed in order to effect a change in the total number of data elements. Linked structures, like the doubly-linked list 12, usually have several pointers associated with them. These pointers act as place markers, maintaining contact with the beginning of a list, its end, the current position, etc.

Figure 2:
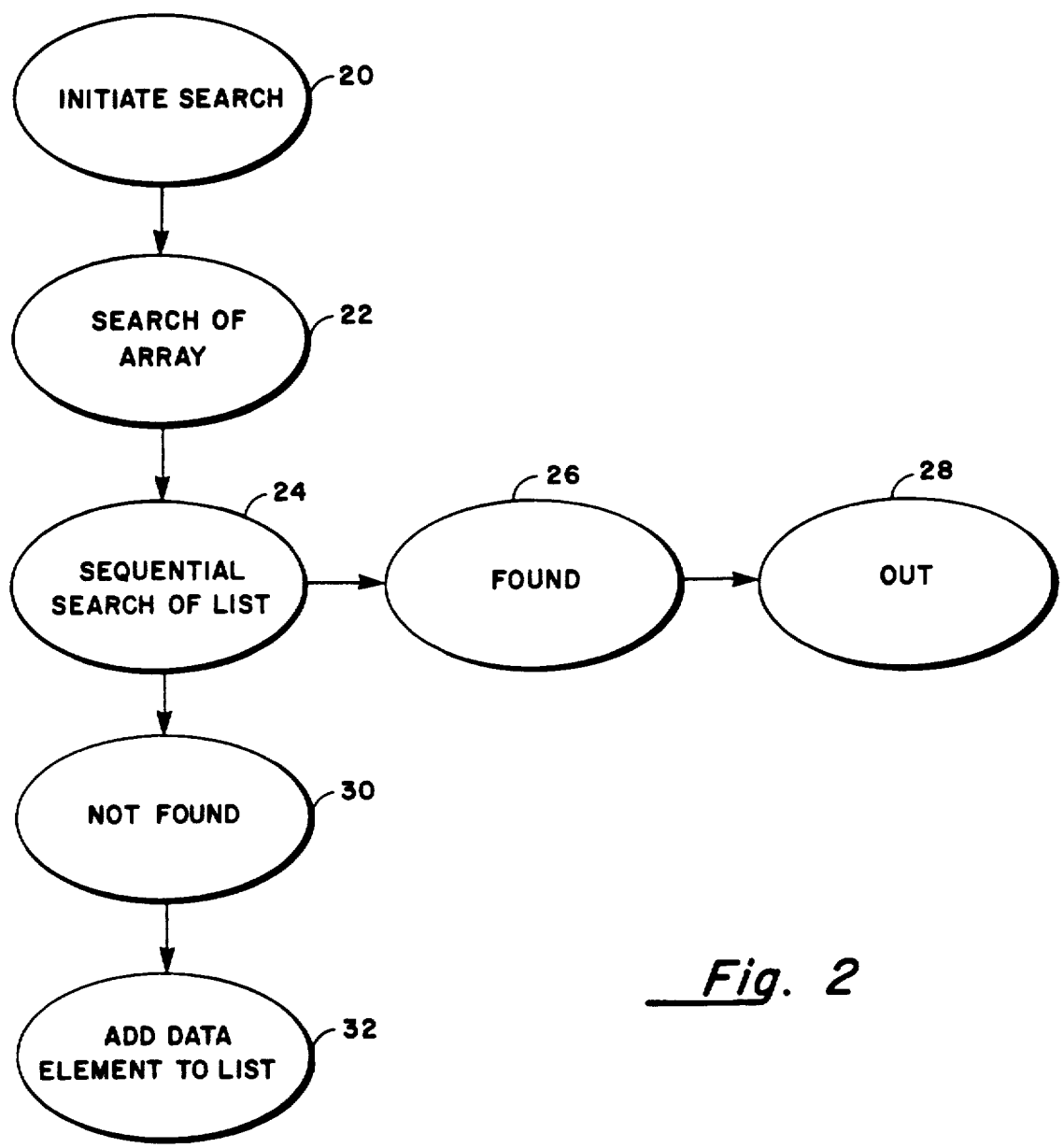
FIG. 2 is a flow diagram illustrating the manner in which a typical search is accomplished via the ADL list of FIG. 1.

FIG. 2 is a flow diagram illustrating the manner in which a typical search of the ADL list is accomplished. A search is initiated 20 and a binary search 22 is applied to the array of address components 18 and 18a (FIG. 1). When the desired address is found, the search is narrowed down to one list segment 16 of the doubly-linked list so that overall seek time is dramatically reduced by eliminating the need to search the entire doubly-linked list. The appropriate list segment 16 may then be linearly traversed 24 to determine if the desired data element 17 is present or not. If the desired data element is not found 30 a new data element will be added to the list 32. If the desired data element is found 26 the search is complete 28.

Figure 3:
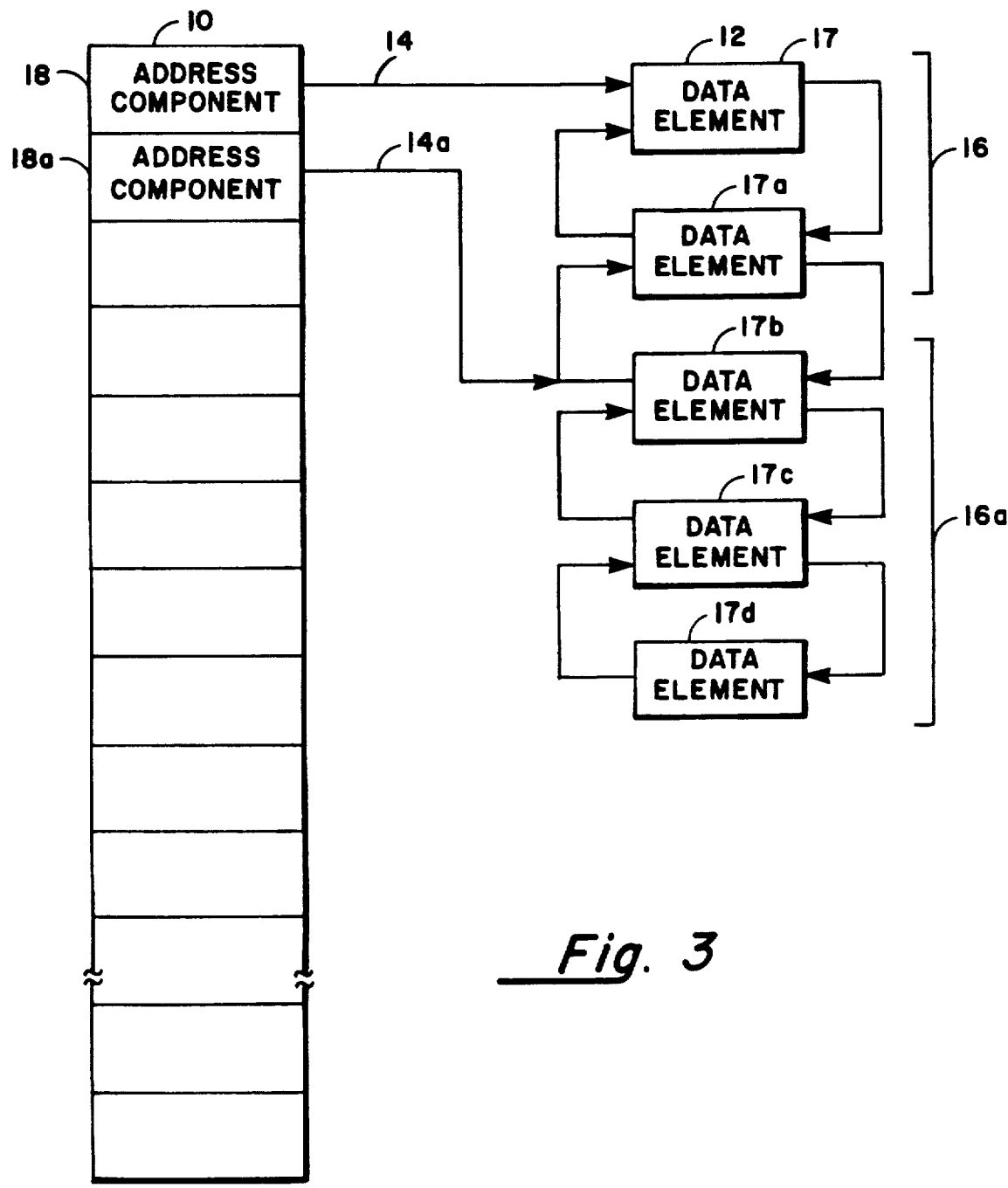
FIG. 3 is a block diagram showing an ADL list with five data elements.

FIG. 3 specifically represents five data elements 17, 17a, 17b, 17c, 17d in the doubly-linked list of data elements 12 associated with two address components 18 and 18a in the array of address components 10. As an example, a search for data element 17d would begin by executing a binary search on the array of address components 10 to identify the address component 18a. Address component 18a would provide the entry point 14a into the list segment 16a, specifically into data element 17b. Linear traversal of the list segment 16a would begin from data element 17b, through data element 17c, until the desired list element 17d was encountered. FIG. 3 represents a snapshot of the ever changing ADL list structure. As the total number of data elements 17 dynamically changes, the ADL list structure changes in response; a change in the total number of data elements 17 produces a potential change in the number of list segments 16, the number of data elements in any given list segment, and a corresponding change in the number of address components 18 in the ordered array 10. These changes will be discussed below.

As mentioned previously, management of the doubly-linked list into list segments 16 is desired to capitalize on the speed of the binary search of the array and minimize the number of data elements 17 in the doubly-linked list that need to be traversed in a linear fashion, and thus expedite the overall search process. FIG. 3 illustrates how the ADL list accomplishes both the binary searching of an array and the minimization of sequential searching on a doubly-linked list by having only the address component of the first data element of each list segment placed in the ordered array 10. More specifically in FIG. 3, the address component 18 in the ordered array 10 provided entry into the first data element 17 of list segment 16, and the address component 18a in the ordered array 10 provides entry into the first data element 17b of list segment 16a.

Figure 4:
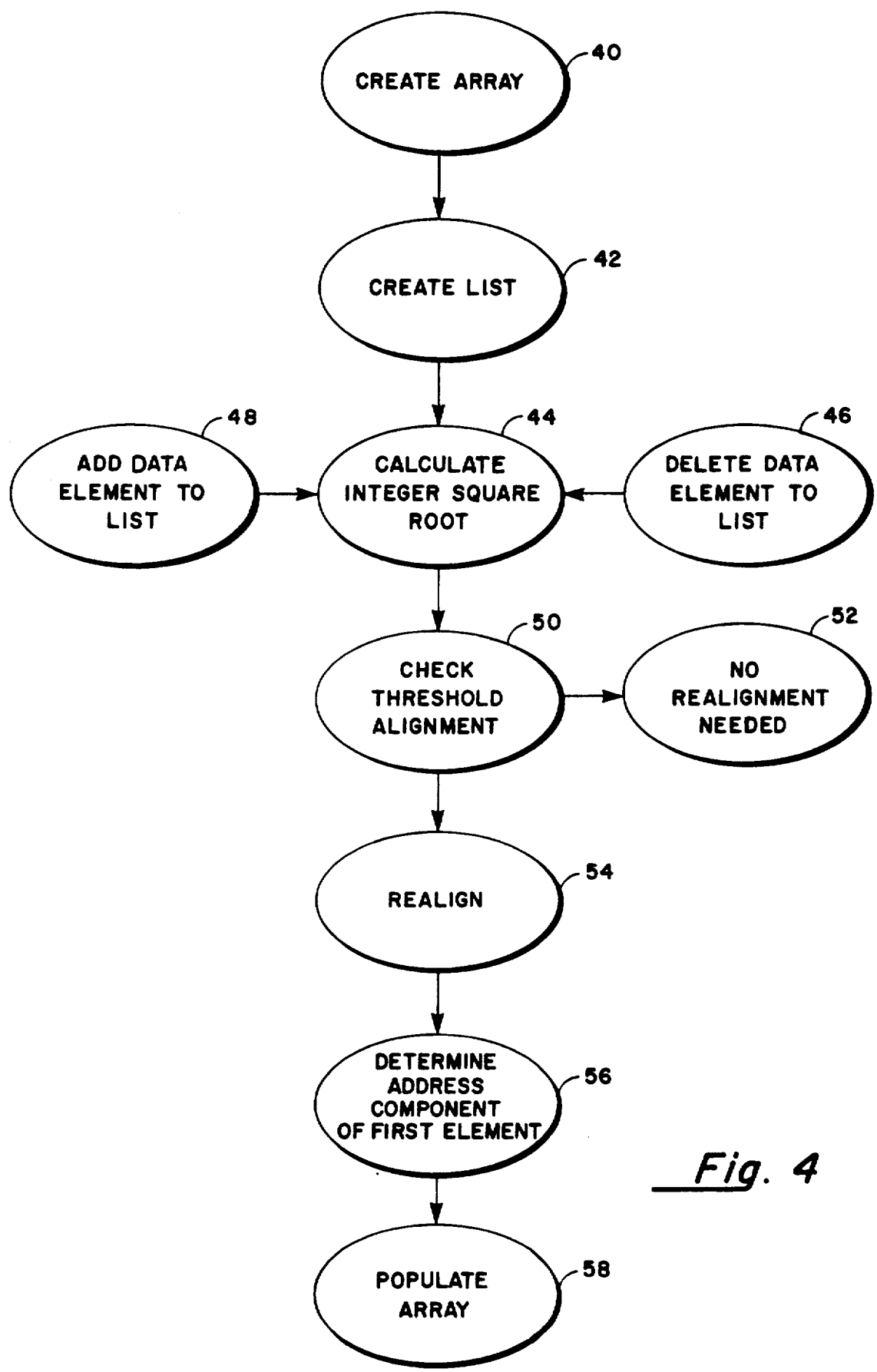
FIG. 4 is a flow diagram illustrating the manner in which the ADL list method manages the doubly-linked list of data elements.

FIG. 4 is a flow diagram illustrating the manner in which the ADL list manages that data element list to 50 minimize seek time of any one data element. After the array of address components 40 and the doubly-linked list of data elements have been created 42, data elements need to be dynamically added to the list 48 and data elements need to be dynamically deleted or removed from the list 46. Upon the addition 48 or deletion 46 of a data element, the integer value of the square root of the total number of data elements is determined 44. This value 44, which is a whole number, is compared with the current number of doubly-linked list segments that are present, identified as check threshold alignment 50, to determine whether a new dynamic regrouping needs to be applied 54 or not 52. Ideal balancing occurs when the total number of data elements are associated into equal groupings. This ideal balance only occurs when the integer value of the square root of the total number of data elements is equal to the number of address components that are valid. This is to say that the number of address components 40 is approximately equal to the total number of data elements squared. If no realigning is needed 52 then the process is complete. If a new dynamic realigning is required 54 the address components of the first members of each of the newly aligned sets is determined 56. The new address components of each of the initial members of each list segment are then written into the array of address components, that is, the array is populated 58 and processing is complete.

Dynamic realignment 54 may result from the deletion of a data element or data elements from the doubly-link list. As a result of this data element deletion, the number of ordered data elements in the reduced doubly-linked list is determined. The square root of the integer value of the number of ordered data elements is then used to determine the number of groupings of list segments of the reduced doubly-linked list. The address component, if the first member of each newly regrouped segment is identified, and the array are adjusted with the address components of each list segment to reflect any dynamic change in the number of groupings of the ordered data elements in the doubly-linked list as a result of the decrease in the integer value of the square root of the total number of data elements.

Because there is processing time associated with the realigning of the ADL list search and management method each time an element is added or deleted, is has been determined that optimum performance using this method occurs when the number of data elements in the doubly-linked list is from 100 to 500 data elements, resulting in an array size of 10 to 23 address components.

Figure 5:
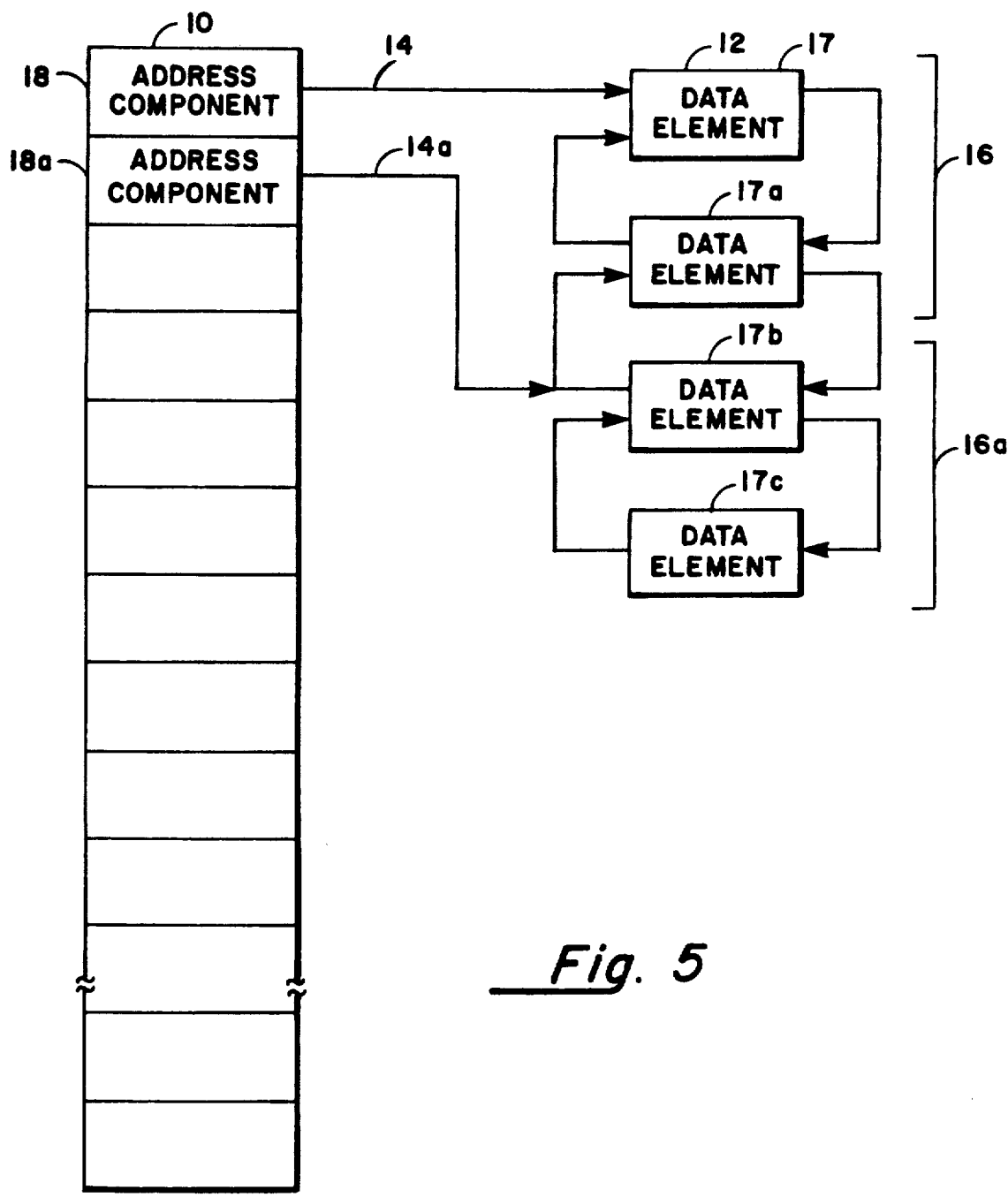
FIG. 5 is a block diagram showing the ADL list with four data elements.

An example of how the addition of data elements affects the dynamic groupings of list segments in the ADL list can be viewed in following the changes in the overall ADL list structure in FIGS. 5, 6, 7, 8, 9, and 10. In FIG. 5, four data elements 17, 17a, 17b, 17c are grouped into two list segments 16 and 16a. The array of address components 10 is populated with two address components 18 and 18a, providing two list entry points 14 and 14a into list data elements 17 and 17b, the initial members of list segments 16a and 16a, respectively. The integer value of the square root of the number of data elements, in this case, four data elements, is again 2. This provides the number of array elements, i.e. address components 18, necessary to correspond to the required number of list segments 16. List segment 16 contains data elements 17 and 17a. List segment 16a contains data elements 17b and 17c.

Figure 6:
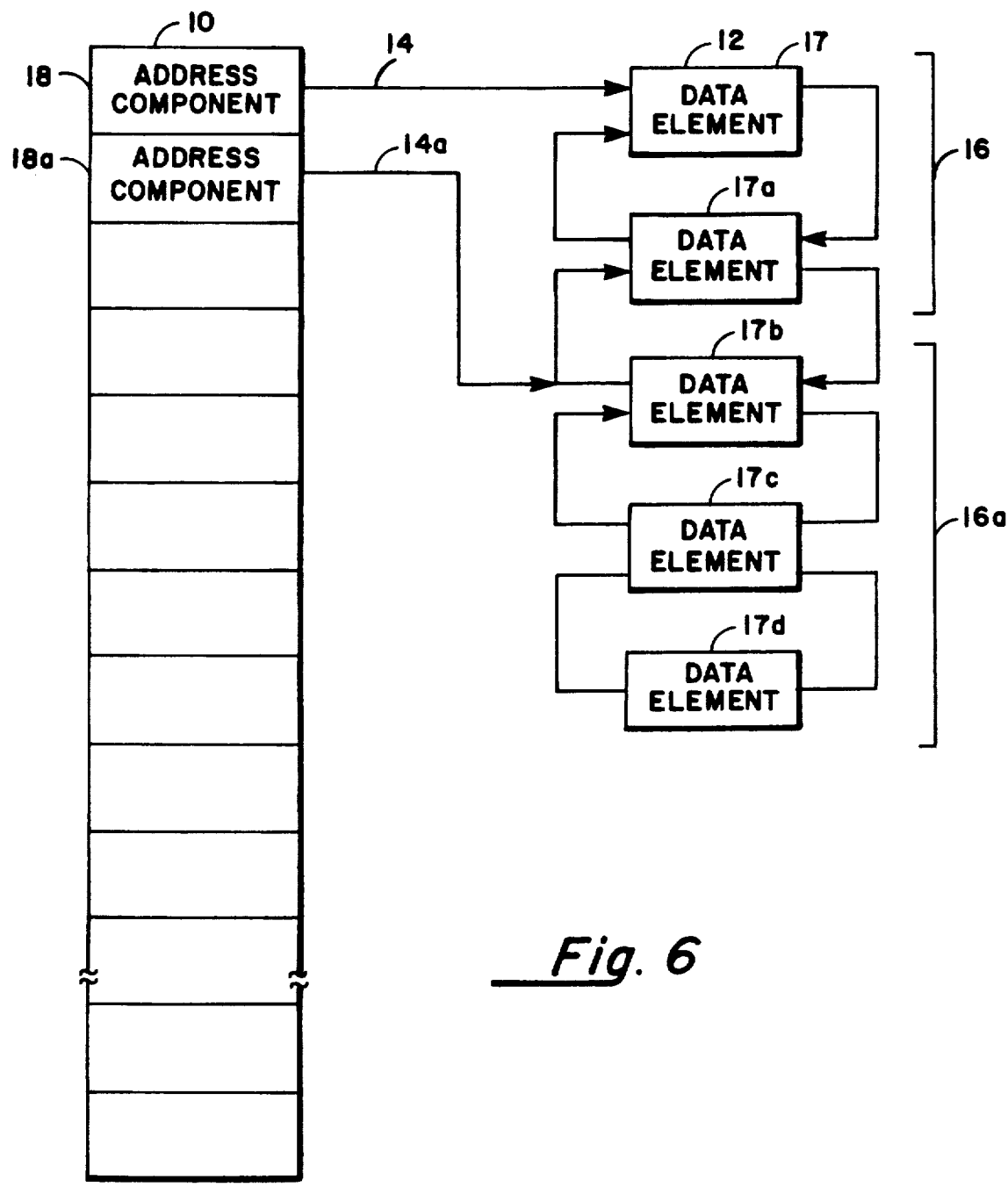
FIG. 6 is a block diagram showing the ADL list with five data elements.

When one new data element is added to the data structure in FIG. 5, the data structure in FIG. 6 results. More specifically, FIG. 6 includes five data elements 17, 17a, 17b, 17c, 17d, grouped into two list segments 16 and 16a. The array 10 of address components is populated with two address components 18 and 18a, providing two list entry points 14 and 14a into list data elements 17 and 17b, the initial members of list segments 16 and 16a, respectively. The integer value of the square root of the number of data elements, in this case, five data elements, is still 2. This provides the number of array elements necessary to correspond to the required number of list segments. List segment 16 contains data elements 17 and 17a. List segment 16a contains data elements 17b, 17c and 17d, resulting in a slight imbalance.

Figure 7:
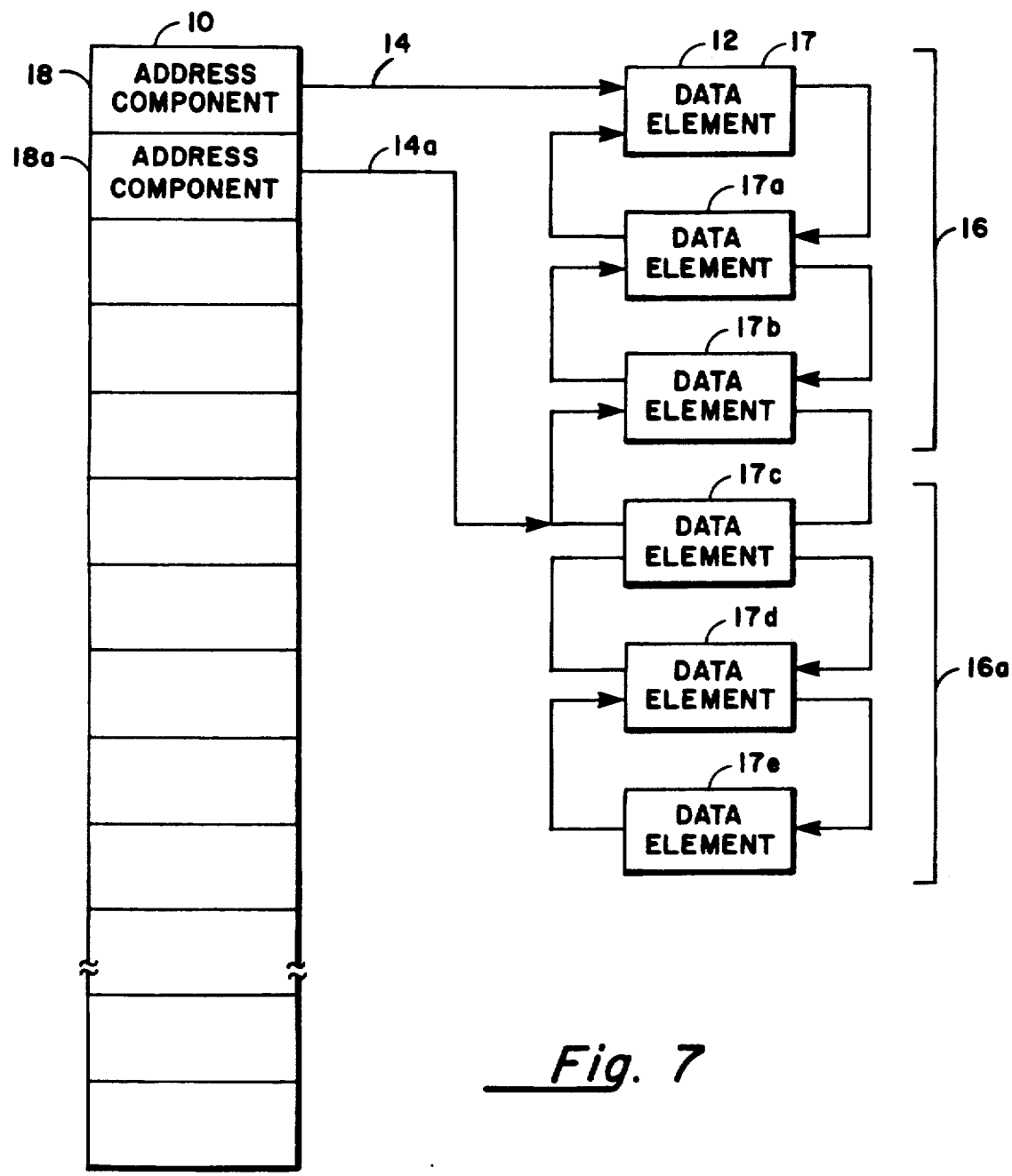
FIG. 7 is a block diagram showing the ADL list with six data elements.

Upon the addition of one new data element to the data structure in FIG. 6, the data structure in FIG. 7 results. More specifically, FIG. 7 includes six data elements 17, 17a, 17b, 17c, 17d, 17e, equally grouped into two list segments 16 and 16a. The array of address components 10 is populated with two address components 18 and 18a, providing two list entry points 14 and 14a into list data elements 17 and 17c, the initial members of list segments 16 and 16a, respectively. The integer value of the square root of the number of data elements, in this case, six data elements, is 2. This provides the number of array elements necessary to correspond to the required number of list segments. List segment 16 contains data elements 17, 17a and 17b. List segment 16a contains data elements 17c, 17d and 17e.

Figure 8:
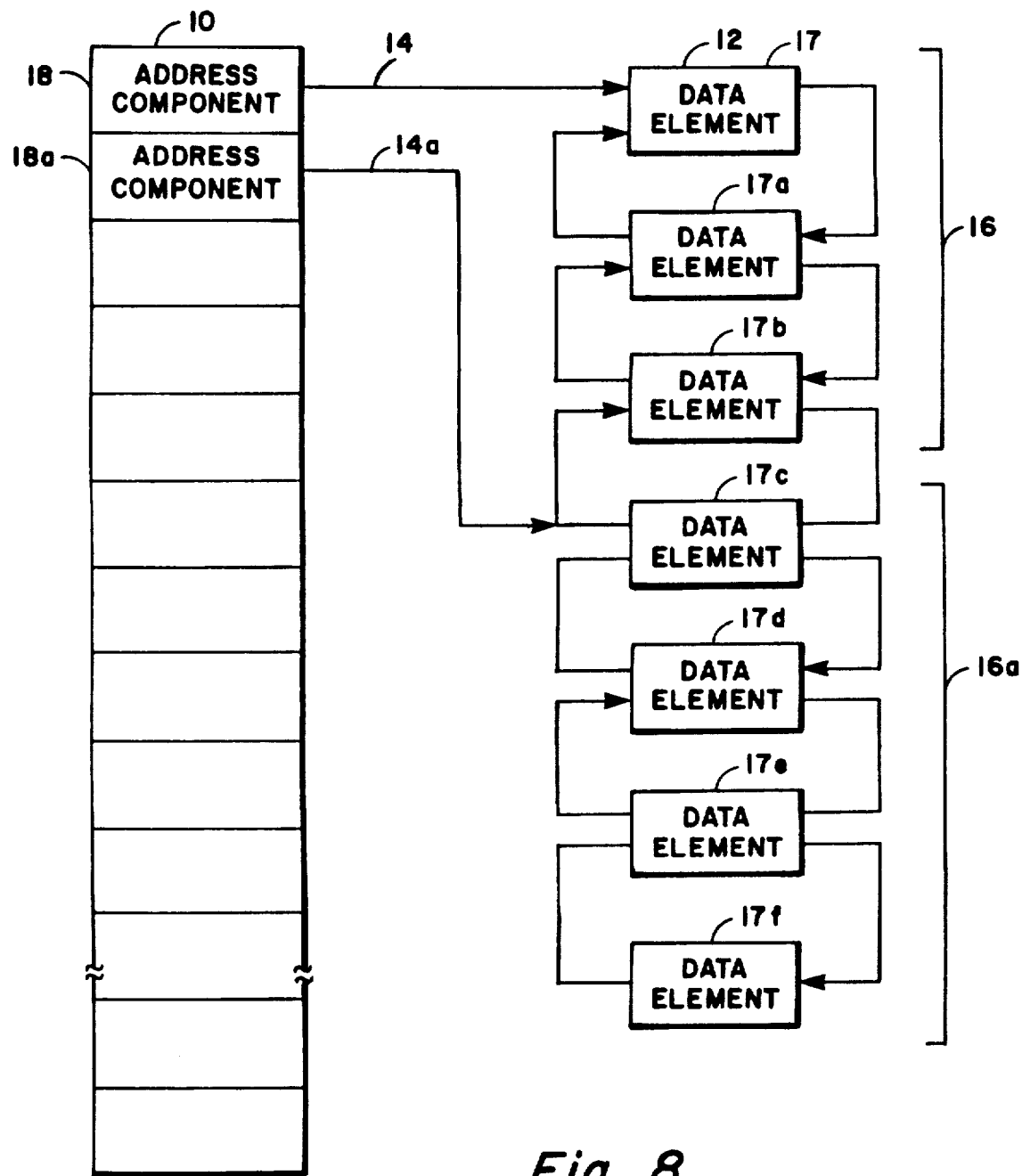
FIG. 8 is a block diagram showing the ADL list with seven data elements.

When one new data element is added to the data structure in FIG. 7, the data structure in FIG. 8 results. More specifically, FIG. 8 includes seven data elements 17, 17a, 17b, 17c, 17d, 17e, 17f, grouped into two list segments 16 and 16a , again, slightly imbalanced. The array of address components 10 is populated with two address components 18 and 18a, providing two list entry points 14 and 14a into list data elements 17 and 17c, the initial members of list segments 16 and 16a, respectively. The integer value of the square root of the number of data elements, in this case, seven data elements, remains at 2. This provides the number of array elements necessary to correspond to the required number of list segments. List segment 16 contains data elements 17, 17a and 17b List segment 16a contains data elements 17c, 17d, 17e and 17f.

Figure 9:
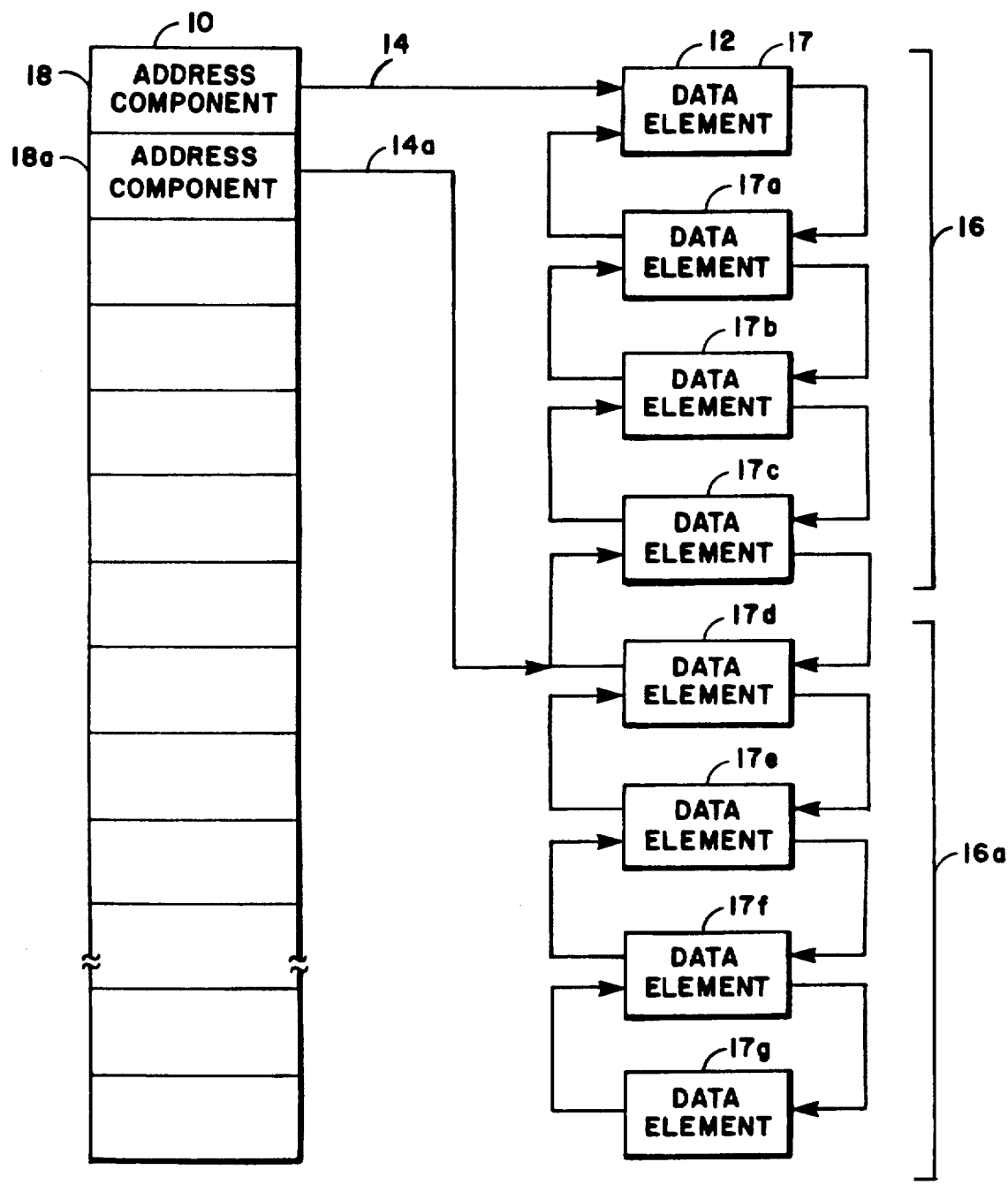
FIG. 9 is a block diagram showing the ADL list with eight data elements.

Upon the addition of one new data element to the data structure in FIG. 8, the data structure in FIG. 9 results. More specifically, FIG. 9 includes eight data elements 17, 17a, 17b, 17c, 17d, 17e, 17f, 17g, grouped into two equal list segments 16 and 16a. The array of address components 10 is populated with two address components 18 and 18a, providing two list entry points 14 and 14a into list data elements 17 and 17d, the initial members of list segments 16 and 16a, respectively. The integer value of the square root of the number of data elements, in this case, eight data elements, still remains at 2. This provides the number of array elements necessary to correspond to the required number of list segments. List segment 16 contains data elements 17, 17a, 17b and 17c. List segment 16a contains data elements 17d, 17e, 17f and 17g.

Figure 10:
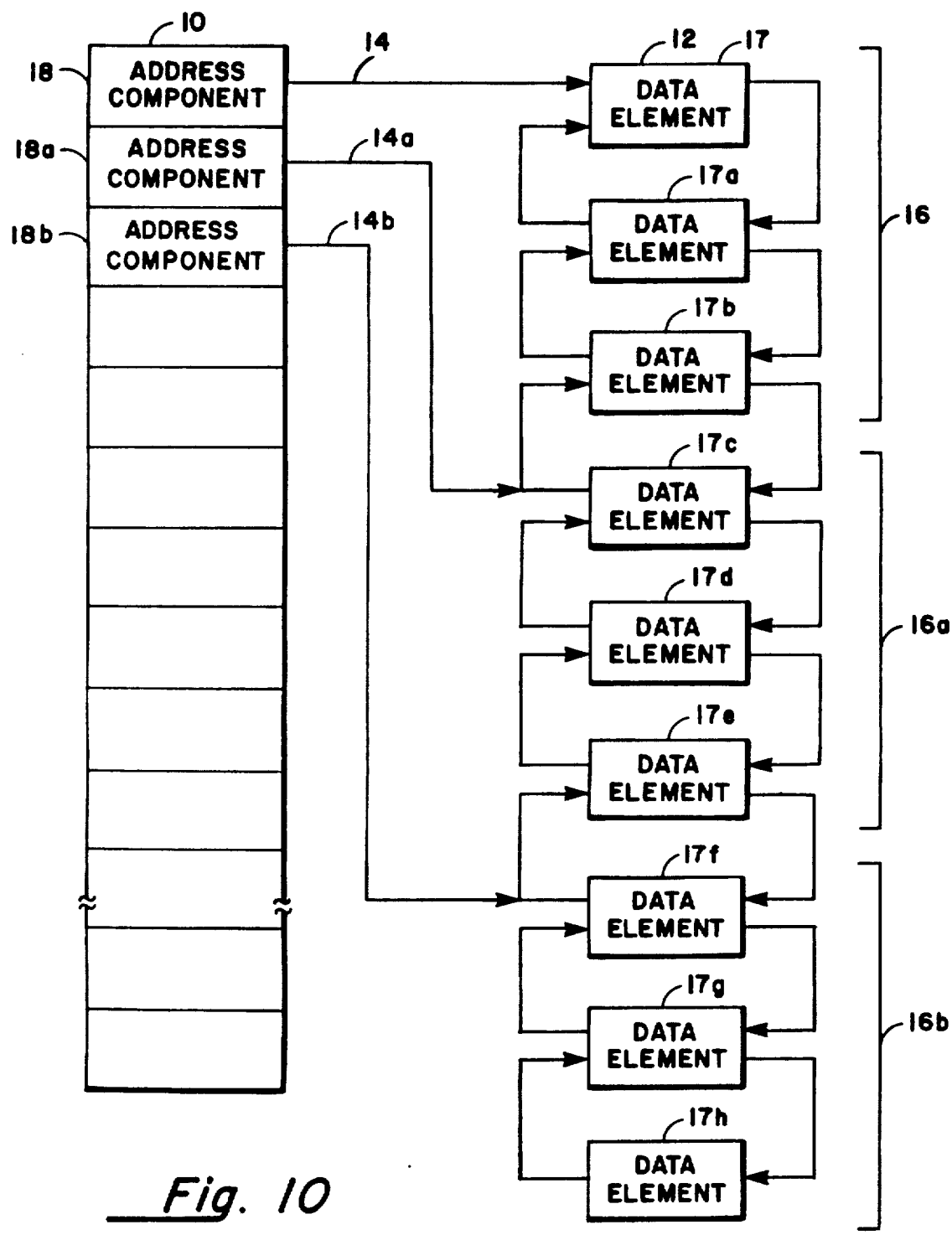
FIG. 10 is a block diagram showing the ADL list with nine data elements.

When one new data element is added to the data structure in FIG. 9, the data structure in FIG. 10 results. More specifically, FIG. 10 includes a gross restructuring of nine data elements 17, 17a, 17b, 17c, 17d, 17e, 17f, 17g, 17h, which are now grouped into three list segments 16, 16a and 16c. The array of address components 10 is populated with three address components 18, 18a and 18b, providing three list entry points 14, 14a and 14b into list data elements 17, 17c and 17f, the initial members of list segments 16, 16a and 16c, respectively. The integer value of the square root of the number of data elements, in this case, nine data elements, has now changed to 3. This provides the number of array elements necessary to correspond to the required number of list segments. List segment 16 contains data elements 17, 17a, and 17b. List segment 16a contains data elements 17c, 17d and 17e. List segment 16b contains data elements 17f, 17g and 17h.

Figure 11:
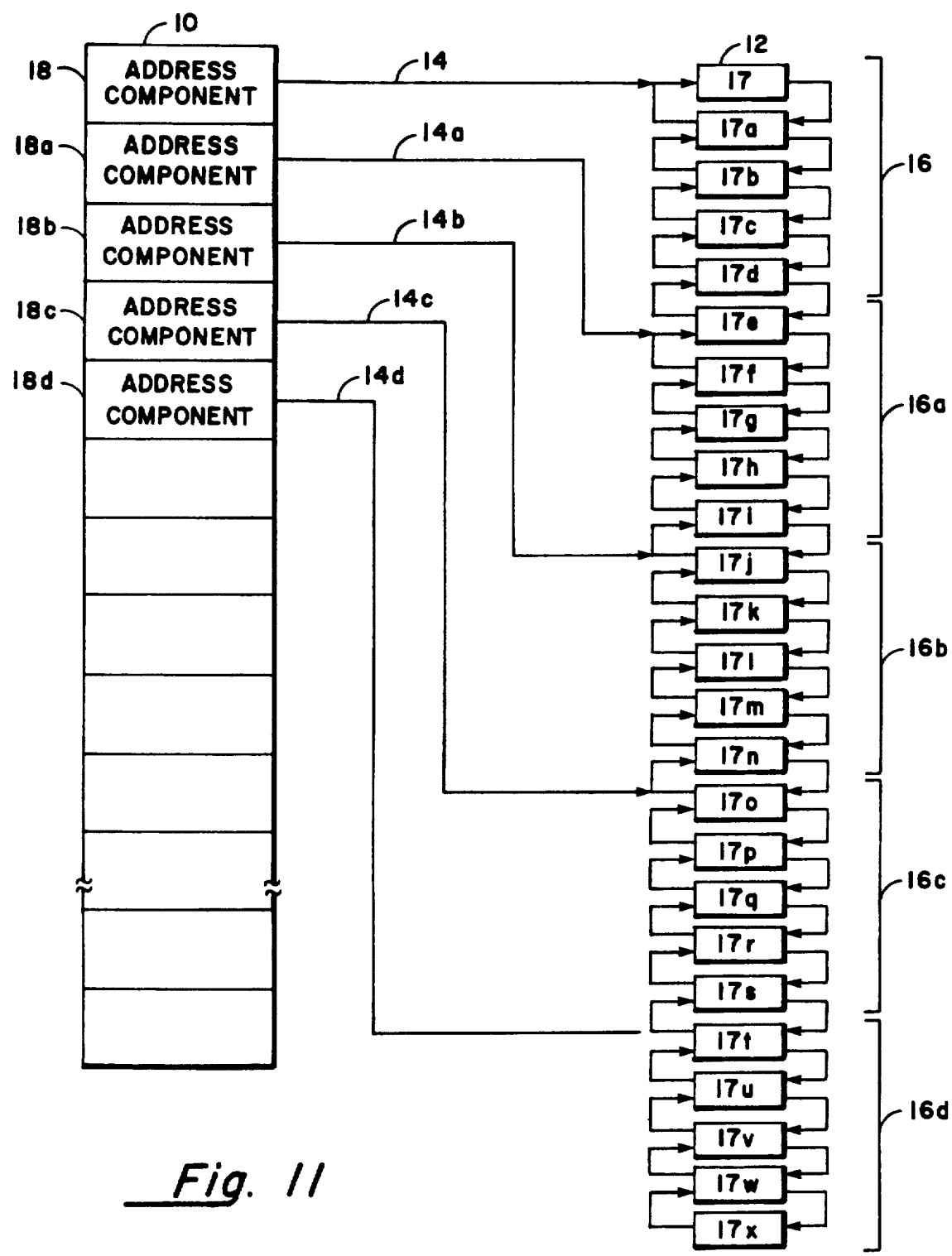
FIG. 11 is a block diagram showing the ADL list with twenty-five data elements.

By way of example, FIG. 11 shows how the next level of gross restructuring occurs at integer value 5, this being at the point when twenty-five data elements are in the doubly-linked list 12. More particularly, FIG. 11 shows twenty-five data elements 17, 17a, 17b, 17c, 17d, 17e, 17f, 17g, 17h, 17i, 17j, 17k, 17l, 17m, 17n, 17o, 17p, 17q, 17r, 17s, 17t, 17u, 17v, 17w and 17x, grouped into five list segments 16, 16a, 16b, 16c, and 16d. The array of address components 10 is filled with five address components 18, 18a, 18b, 18c and 18d, providing five list entry points 14, 14a, 14b, 14c and 14d into list data elements 17, 17e, 17j, 17o and 17t. The integer value of the square root of the number of data elements, in this case, twenty-five data elements, is 5. This provides the number of array elements necessary to correspond to the required number of list segments. List segment 16 contains data elements 17, 17a, 17b, 17c and 17d. List segment 16a contains data elements 17e, 17f, 17g, 17h and 17i. List segment 16b contains data elements 17j, 17k, 17l, 17m and 17n. List segment 16c contains data elements 17o, 17p, 17q, 17r and 17s. List segment 16d contains data elements 17t, 17u, 17v, 17w and 17x.

Figure 12:
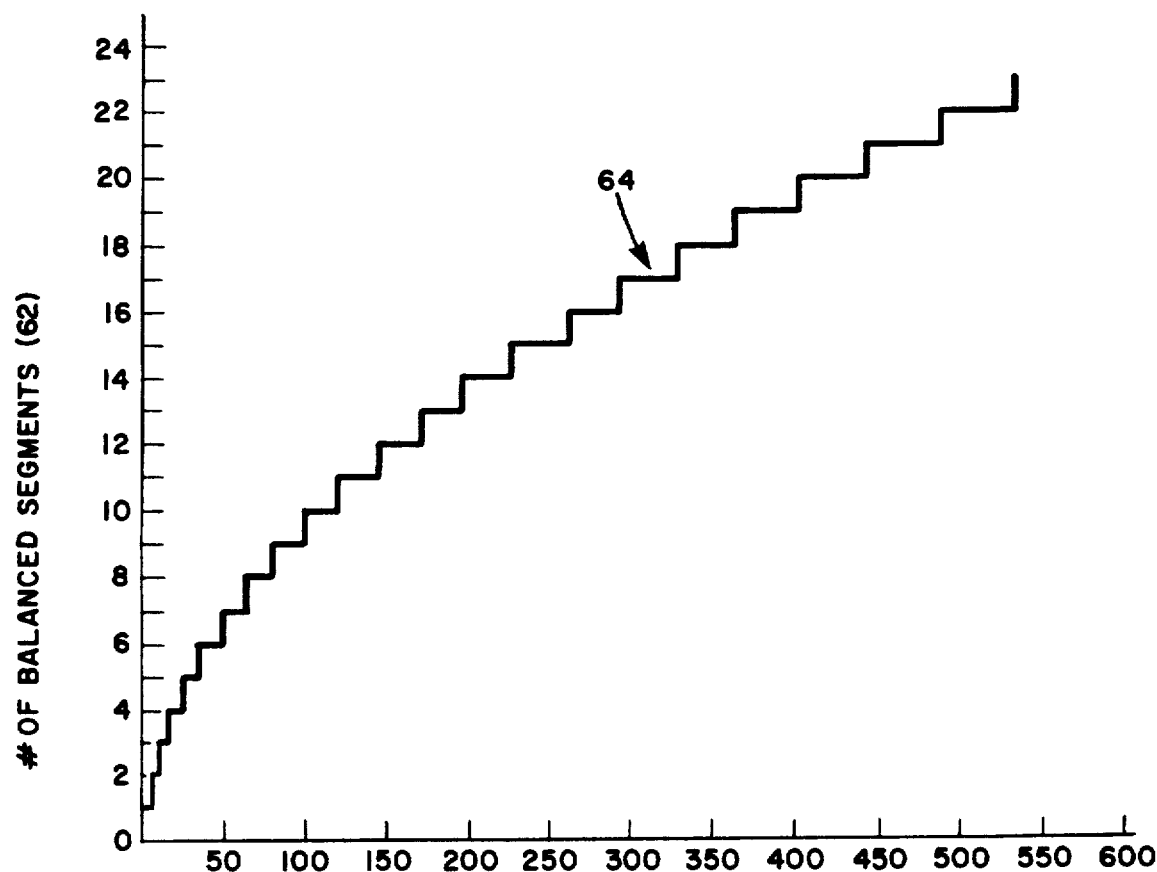
FIG. 12 is a graph illustrating the dynamic relationship between the total number of data elements and the corresponding number of list segments.

FIG. 12 shows the dynamic relationship between the total number of data elements (horizontal scale 60) and the corresponding number of list segments (vertical scale 62). More, specifically, the step type graph 64 shows how the ADL list structure changes in response to the addition or deletion of data elements in the doubly-linked list, resulting in a dynamic grouping of the structure to minimize search time.

There has been described a new and useful method for managing and searching for data elements stored in computer memory. Specifically, a doubly-linked list of data elements is grouped into smaller list segments by using a simple mathematical relationship. Entry into each list segment is provided by associating an array of address components as a means to access each list segment directly. Search time is minimized by first performing a binary search on the address component array, and only then performing a sequential search of the data elements in the doubly-linked list. The number of list segments and corresponding number of address components in the array is mathematically related to the total number of data elements, and dynamically changes as data elements are added or deleted from the list, with a realignment of the number of data elements in each individual list segment until there is a change in the integer value. It should be appreciated that modifications and additions will be apparent to those of ordinary skill in the art in applying the teachings of the invention described herein to various applications. Accordingly, the invention should not be limited by the description herein of a preferred embodiment but, rather, the invention should be construed in accordance with the following claims.

What is claimed is:

1. In a system having data stored in a list of ordered data elements in memory, a method of searching and maintaining the data in memory comprising the steps of:
 a. creating an array;
 b. creating a doubly-linked list of ordered data elements;
 c. determining the number of ordered data elements in the doubly-linked list;
 d. dynamically grouping the doubly-linked list of ordered data elements into list segments by:
   determining the square root of the total number of data elements in the doubly-linked list; using the integer value of the square root of the total number of data elements to identify the number of list segments;
 e. filling the array with an address component of the first data element of each list segment;

f. searching the doubly-linked list for a data element having a specified data value, including the steps of:
   searching the array for an address component;
   scanning the doubly-linked list sequentially from an entry point of a list segment; and
g. retrieving the thus searched-for data element from the identified doubly-linked list member.

2. In a system having data stored in a list of ordered data elements in memory, a method of searching and maintaining the data in memory comprising the steps of:
   a. creating an array;
   b. creating a doubly-linked list of ordered data elements;
   c. determining the number of ordered data elements in the doubly-linked list;
   d. determining the square root of the total number of ordered data elements in the doubly-linked list;
   e. establishing a number of list segments of data elements in the doubly-linked list by using the integer value of the square root;
   f. identifying the address component of the first data element of each list segment;
   g. filling the array with the identified address components to provide an ordered array;
   h. in response to a change in the number of ordered data elements, dynamically realigning the number of data elements within a list segment to approximate the same number of data elements in each list segment such that the number of address components is approximately equal to the total number of data elements squared;
   i. re-identifying the address component of the first data element of each reorganized list segment;
   j. refilling the array with the re-identified address components of the reorganized list segments;
   k. providing an ordered array;
   l. in response to a request for identification of a data element having a specified address component, searching the reordered array to find its associated list segment; and
   m. traversing the found list segment to find the data element.

3. The method of claim 2 wherein the step of dynamically realigning the number of ordered data elements within a list segment includes the steps of:
   a. adding a data element to the doubly-linked list;
   b. determining the number of ordered data elements in the expanded doubly-linked list;
   c. using the integer value of the square root of the total number of ordered data elements to identify a number of groupings of list segments of the expanded doubly-linked list;
   d. identifying the address component of the first member of each newly regrouped segment; and
   e. readjusting the array with the address components of each of the first members of each list segment to reflect any dynamic change in the number of groupings of the data elements in the doubly-linked list as a result of an increase in the integer value of the square root of the total number of data elements.

4. The method of claim 2 wherein the step of dynamically realigning the number of data elements within a list segment includes the steps of:
   a. deleting a data element to the doubly-linked list;
   b. determining the number of ordered data elements in the reduced doubly-linked list;
   c. using the integer value of the square root of the total number of ordered data elements to identify a number of groupings of list segments of the reduced doubly-linked list;
   d. identifying the address component of the first member of each newly regrouped segment; and
   e. readjusting the array with the address components of each of the first members of each list segment to reflect any dynamic change in the number of groupings of the ordered data elements in the doubly-linked list as a result of a decrease in the integer value of the square root of the total number of data elements.

5. A system having data stored in a list of ordered data elements in a memory, comprising:
   a. means for determining the number of ordered data elements in a doubly-linked list;
   b. means for grouping and regrouping the number of ordered data elements in the doubly-linked list into list segments;
   c. means for determining an address component of each of the initial members of each list segment
   d. means for providing an ordered array comprising an address component of each of the initial members of each list segment;
   e. means for dynamically adjusting the number of list segments in response to an expansion or reduction of a plurality of ordered data elements using the integer value of the square root of the number of ordered data elements;
   f. means for dynamically adjusting the array in response to an expansion or reduction of a plurality of data elements;
   g. means for searching the array for an appropriate address component; and
   h. means for searching the doubly-linked list for an appropriate data element.

* * * * *